United States Patent [19]

Alkofer

[11] Patent Number: 4,651,199
[45] Date of Patent: Mar. 17, 1987

[54] METHOD FOR DETECTING BLANK FRAMES IN A PHOTOGRAPHIC COLOR PRINTER

[75] Inventor: James S. Alkofer, Hamlin, N.Y.
[73] Assignee: Eastman Kodak Company, Rochester, N.Y.
[21] Appl. No.: 730,628
[22] Filed: May 6, 1985
[51] Int. Cl.[4] .......................... G03F 3/08; H04N 1/46; G03B 27/80
[52] U.S. Cl. ........................................ 358/80; 358/75; 355/38
[58] Field of Search ........................ 358/75, 76, 78, 80, 358/280, 283, 284, 256; 382/18; 355/38, 35, 40, 41, 77, 88, 68

[56] References Cited

U.S. PATENT DOCUMENTS

| | | | |
|---|---|---|---|
| 4,239,384 | 12/1980 | Treiber | 355/68 |
| 4,410,909 | 10/1983 | Ueda et al. | 358/78 |
| 4,467,364 | 8/1984 | Konagaya | 358/76 |
| 4,472,736 | 9/1984 | Ushio et al. | 358/75 |

FOREIGN PATENT DOCUMENTS

13415  2/1978  Japan ........................................ 355/38

Primary Examiner—James J. Groody
Assistant Examiner—Randall S. Svihla
Attorney, Agent, or Firm—Thomas H. Close

[57] ABSTRACT

In automatic photographic printers, it is a problem to accurately detect and skip blank (unexposed or completely exposed) film frames automatically. The problem is solved by scanning a film frame in three colors to generate color value samples, compiling histograms of the color value samples, computing the standard deviations of the color histograms, comparing the standard deviations with predetermined constant values, and generating a signal indicating the presence of a blank frame when all the standard deviations are less than their respective predetermined constants. The method is particularly useful in a scanning-type color photographic printer employing histogram modification to effect tone-scale and color balance adjustments.

5 Claims, 9 Drawing Figures

METHOD FOR DETECTING BLANK FRAMES IN A PHOTOGRAPHIC COLOR PRINTER

TECHNICAL FIELD

The present invention is directed to a method for automatically detecting blank (unexposed or completely exposed) frames in a group, e.g. a strip or disc of color negative film, of photographic color originals which are unsuitable for printing in a photographic color printer.

BACKGROUND ART

In automatic photographic color printing, the printing of a blank (unexposed or completely exposed) frame is a waste of time and materials. It is well known in automatic photographic printers and negative scanners to attempt to detect unexposed frames by examining the distribution of densities in parts of the film image, and to formulate some criteria for detecting unexposed frames. For example, U.S. Pat. No. 4,239,384 issued Dec. 16, 1980, to Treiber, discloses a negative scanning system that measures the average densities of different zones of a negative, defined as foreground, background and central zones, and predicts the unprintability of an image frame thereby.

Photographic printers have been proposed that scan a color image point by point to produce a digital color image. The digital color image is processed in a digital computer to improve tone-scale and color balance, and then the digital color image is printed by scanning the processed digital image onto an output medium such as color photographic paper.

In such scanning type color photographic printers, it is also desirable to automatically detect and not print blank frames in a photographic film. Although the methods of detecting blank frames employed in the prior art were appropriate for the sophistication of the equipment available at the time, in the scanning color photographic printer because of the nature of the scanning reproduction process, orders of magnitude more image density data is available for ascertaining the printability of an original. As a result, although the prior art methods of detecting blank film frames were successful and appropriate for the existing state of the art, improvements in detection accuracy can be made with the greater amounts of image data available in a scanning type photographic printer.

It is the object of the invention to provide a method for detecting blank frames of photographic originals in a scanning type photographic color printer that is capable of more accurately detecting such blank frames by making use of the greater quantity of image data available in such scanning type printers.

DISCLOSURE OF THE INVENTION

The object of the invention is achieved by detecting the presence of a blank film frame as a function of the standard deviation of the primary color values in the image. In a preferred mode of practicing the invention, the standard deviations of the density distributions of a color original in each of three primary colors (e.g. red, green and blue) are computed and compared with predetermined constants to automatically determine whether the original is a blank (i.e. unexposed) frame. For example, if the standard deviation of the distribution of red and green densities are less than 0.04 and the standard deviation of the blue density distribution is less than 0.08, the frame is determined to be blank, and no print is made.

The method is employed in a scanning type photographic color printer that employs histogram normalization of a sample of color values to generate color reproduction functions that are applied to the tone values of the digital color image. The printer includes a statistics computer that computes the statistics of color value distributions used in selecting the sample of color values for normalization. This method of adjusting tone-scale and color balance is the subject of copending U.S. patent application Ser. No. 730,627. With such a scanning type color photographic printer, the invention has the further advantage that the standard deviations of the distributions of color values are readily available.

BRIEF DESCRIPTION OF THE DRAWINGS

The invention will be described with reference to the drawings wherein.

MODES OF CARRYING OUT THE INVENTION

Figure 1:
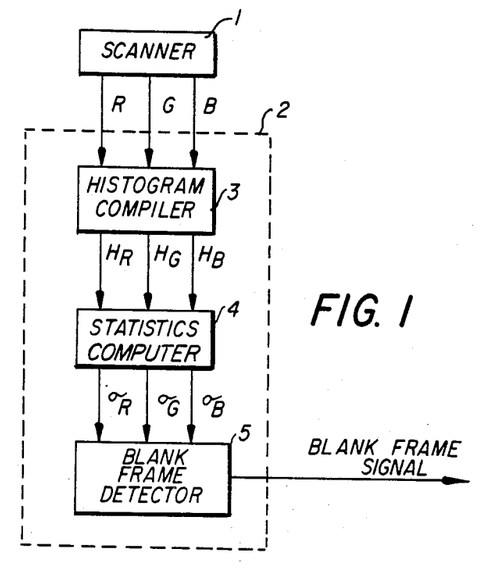
FIG. 1 is a block diagram illustrating the basic steps in detecting a blank frame according to the present invention.

The method of detecting blank frames will first be described with reference to FIG. 1. In FIG. 1, a scanner 1 scans a color film image to produce a digital color image signal having three color components R, G and B. A digital computer 2 receives the digital color image signal, and is programmed to detect and signal the presence of a blank frame in the scanner. The digital computer 2 is programmed to provide a histogram compiler 3 for compiling histograms $H_R$, $H_G$, and $H_B$ of the three color components of the digital color image signal. A statistics computer 4 receives the histogram data and computes the standard deviation $\sigma_R$, $\sigma_G$, and $\sigma_B$ of the respective histograms. A blank frame detector 5 compares the standard deviations of the histograms with 3 predetermined constants. If the standard deviation of each color distribution is less than the respective predetermined constant, the blank frame detector generates a signal representing the presence of a blank frame.

Figure 2:
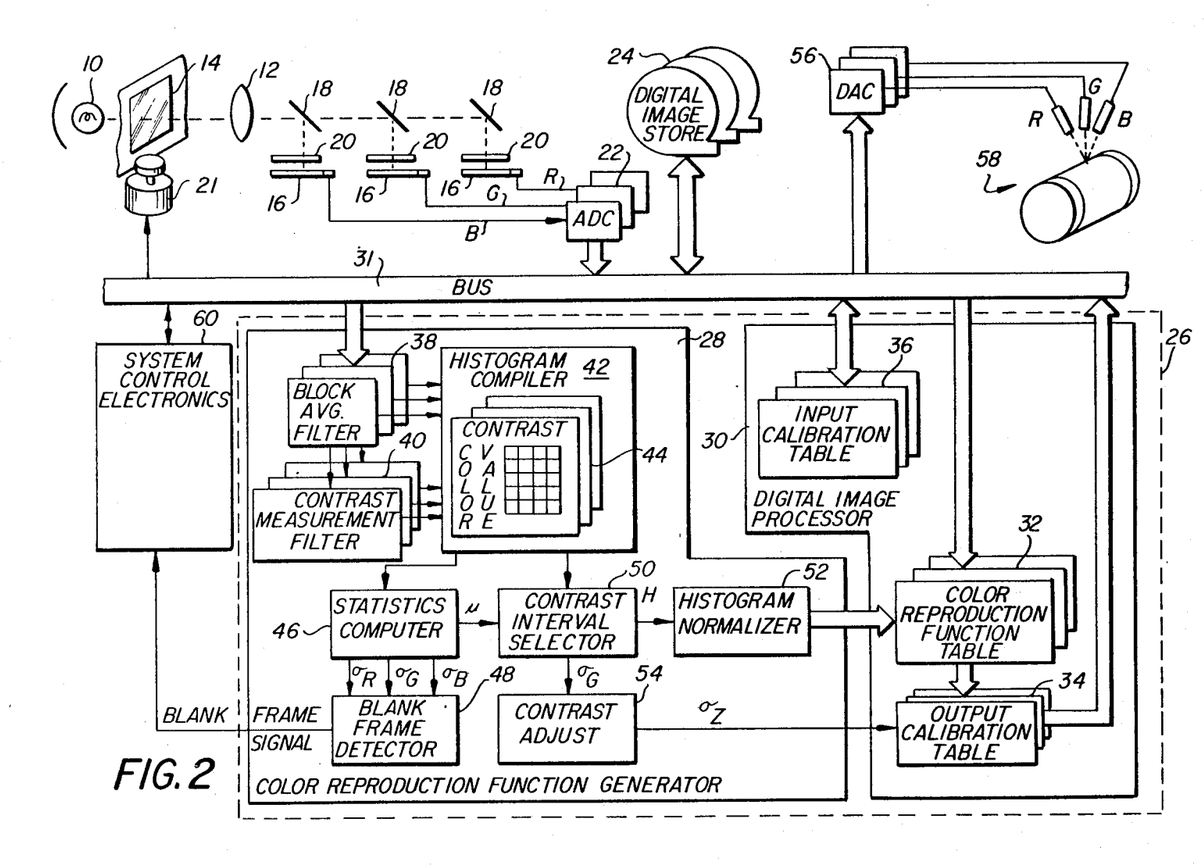
FIG. 2 is a schematic diagram illustrating a a scanning type color photographic printer particularly suited for carrying out the method of the present invention.

Turning now to FIG. 2, a preferred embodiment of the invention employed in a scanning type photographic color printer will be described. The input device includes a light source 10 and lens 12 for projecting an image of color negative film 14 onto three solid state image sensing arrays 16, such as CCD image sensors. The image is directed to the image sensing array 16 by dichroic beam splitters 18 through color trimming filters 20, to form a red, green and blue separation image on the respective image sensors. A film advance motor 21 advances the film in the printer. The image sensors 16 scan the color photographic negatives to produce three color separation signals R, G and B. The signals thus produced are supplied to analog-to-digital converters 22 that each produce an 8-bit output code representing one of 256 possible signal levels for each sample point in the three colors.

The digital color image signals are stored in a digital image storage memory 24, such as a magnetic tape, disc, or solid state semiconductor memory. The digital color image signals are processed in a digital computer 26. A DEC 2060 mainframe computer was used.

The digital computer 26 is programmed to include a color reproduction function generator 28 and a digital image processor 30. The digital image processor 30 applies color reproduction functions generated by color reproduction function generator 28 to the digital color image. The color reproduction function generator 28 receives the digital color image from the digital image storage device 24 via data and control bus 31 and generates a color reproduction function table 32 for each color. The color reproduction function generator 28 also generates a multiplicative constant $\sigma_z$ for adjusting the contrast of the processed image as described below and supplies the constant to three output calibration tables 34.

Prior to storing the digital color image in digital image store 24, each input signal level is converted to an input color value, such as photographic density, by a known scanner calibration function. The calibration function for each color is implemented in the form of a look up table 36 in the digital image processor 30, to convert each 8-bit input value to an 8-bit value representing the color negative density at the scanning point.

The color reproduction function generator 28 includes digital filters 38 for performing a block average of the color values of the color components of the digital color image. Digital filters 40 detect the contrast of the image around each block averaged color value sample in each of the three colors. A histogram compiler 42 compiles the block averaged color values from a plurality of contrast intervals in each color, in a plurality of histogram memories 44.

Figure 3:
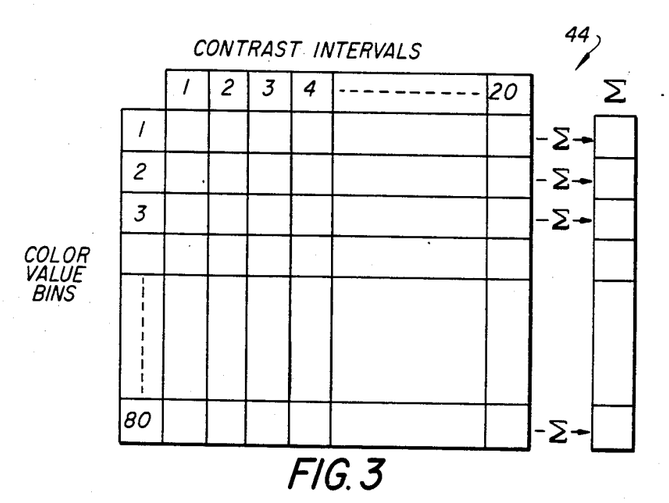
FIG. 3 is a schematic diagram showing the organization of the histogram memories used to compile the color value histograms in the apparatus of FIG. 2.

FIG. 3 shows, in a graphic way, the organization of one of the histogram memories 44 for one of the colors. There are twenty contrast intervals having a width of 0.04 log contrast units each and one interval labeled $\Sigma$ representing the full distribution of color values (i.e. all color values, regardless of local contrast) in the color component of the signal. The width of the contrast intervals was chosen to be approximately twice the minimum visual log contrast threshold. The 256 color values are divided into 80 color value (density) bins, for a resolution of 0.05 density units per bin. Counts are accumulated in the appropriate bins in the histogram memories until all of the color values from the digital color image are counted. The number of counts in the bins labelled $\Sigma$ are equal to the sums of the counts in corresponding bins one through twenty.

Returning to FIG. 2, a statistics computer 46 in the color reproduction function generator 28 computes the statistical moments $\mu$ and the standard deviations $\sigma_R$, $\sigma_G$, and $\sigma_B$ of the distributions of color values in the histogram memories 44 as described below.

A blank frame detector 48 receives signals representing the standard deviations $\sigma_R$, $\sigma_G$ and $\sigma_B$ of the full distribution of the red, green, and blue color values from the statistics computer 46 and generates a signal representing the presence of a blank frame in the scanner.

A contrast interval selector 50 receives the statistical data from the statistics computer 46 and selects a contrast interval on the basis of the statistical moments of the distributions of color values in the contrast intervals. The contrast interval selector 50 supplies the color value histograms H in the selected contrast interval to a histogram normalizer 52. The histogram normalizers 52 normalize the color value histograms from the selected contrast interval to generate the color reproduction function lookup tables 32 in digital image processor 30.

A contrast adjustment computer 54 receives the standard deviation $\sigma_G$ of the green color value distribution in the selected contrast interval and generates a multiplicative constant $\sigma_z$ used to determine the contrast of the processed image. The multiplicative constant $\sigma_z$ is provided to output calibration tables 34 in the digital image processor 30. All the processed color values in all three colors are multiplied by this same constant.

The color reproduction function lookup tables 32 relate each of the 256 possible input values in the respective colors to one of 256 possible output values. After the color reproduction function lookup tables 32 have been generated, the digital image processor 30 processes the digital image by applying the color reproduction functions to the respective color components of the digital color image. The output calibration functions are then applied to the respective color components of the processed digital color image. The processed digital color image is converted to analog form by digital-to-analog converters 56. The processed analog color signal is then applied to an output scanning device 58 to reproduce the image. The output device 58 is a drum-type scanner having red, green and blue laser light sources that are modulated by the respective analog color signals to expose a light sensitive medium such as color photographic paper.

System control electronics 60 controls and coordinates the operation of input and output scanning devices and the digital image processing computer 26. When the system control electronics receives the blank frame detect signal from blank frame detector 48, the system control electronics 60 signals the computer 26 not to process the digital image, and to advance the film 14 to the next frame by film advance motor 21.

The method of generating the blank frame detect signal and the color reproduction functions will now be described in more detail with reference to the flow charts of FIGS. 4–8.

Figure 4:
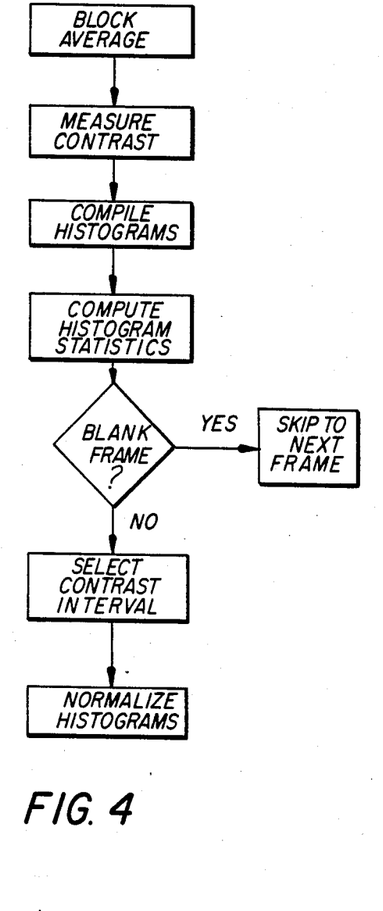
FIGS. 4–8 are flow charts illustrating the operation of the apparatus shown in FIG. 2.

Referring first to the flow chart of FIG. 4, the processing steps performed on the color digital image to generate the respective color reproduction functions will be described. All three color components are processed through these steps. First a block average of the color values of the sampled digital image is formed. This is accomplished by applying a digital filter to the digital image color values of the form:

$$\begin{bmatrix} 1 & 1 & 1 & 1 \\ 1 & 1 & 1 & 1 \\ 1 & 1 & 1 & 1 \\ 1 & 1 & 1 & 1 \end{bmatrix} / 16. \tag{1}$$

This averaging is performed by the block average filters 38 shown in FIG. 2 to reduce the effects of film grain on the color value statistics.

Next, a digital filter representing a Laplacian operator of the form:

$$\begin{bmatrix} 0 & -1 & 0 \\ -1 & 4 & -1 \\ 0 & -1 & 0 \end{bmatrix} \qquad (2)$$

is applied to the block averaged color values of the digital image to measure the contrast of the image at each block averaged sample point. This operation is performed by the contrast measurement filter 40 in FIG. 2. The Laplacian operator has the property of exhibiting no response to uniform areas or linear gradients, and exhibits a response only to changes in gradients. The Laplacian operator works well in measuring the contrast of the color components of the image. However, it is to be understood that other contrast measuring filters may be employed.

The respective histograms in each contrast interval for each color component are compiled as discussed above, and their statistics are computed. A check for a blank frame is performed by examining the statistics of the full red, green and blue distributions. If a blank frame is detected, as described below, the system control electronics skips the frame and proceeds to the next frame. If a blank frame is not detected, a contrast interval is selected on the basis of the statistical parameters of the color value distributions in the contrast intervals, and the histograms of color values in the selected contrast interval are normalized to generate the respective color reproduction function for each color.

Figure 5:
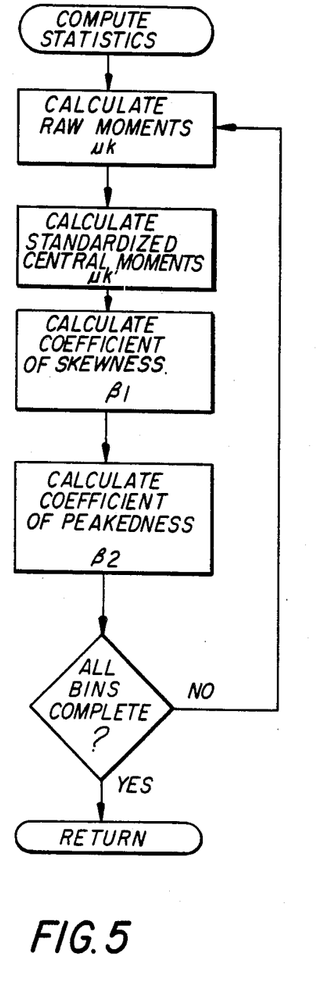

FIG. 5 is a flow chart showing the steps involved in compiling the histogram statistics for each contrast interval and the full distribution, in each color. The raw moments $\mu_k$ taken about the mean, are computed as follows:

$$\mu_k = \frac{1}{N}\left(\sum_{i=1}^{N}(x_i - \bar{x})^k\right) \qquad (3)$$

where
N is total number of samples in the contrast interval;
$x_i$ is a color value; and
$\bar{x}$ is the mean color value.

The standardized central moments $\mu'_k$ are calculated as follows:

$$\mu'_k = \frac{\mu_k}{\sigma^k}, \text{ where } \sigma = \sqrt{\mu_2} \qquad (4)$$

The coefficient of symmetry (skewness) for each distribution is then represented as $$\beta_1 = (\mu'_3)^2 \qquad (5)$$

and the coefficient of peakedness (kurtosis plus 3) is represented as $$\beta_2 = \mu'_4 \qquad (6)$$

Figures 6, 7:
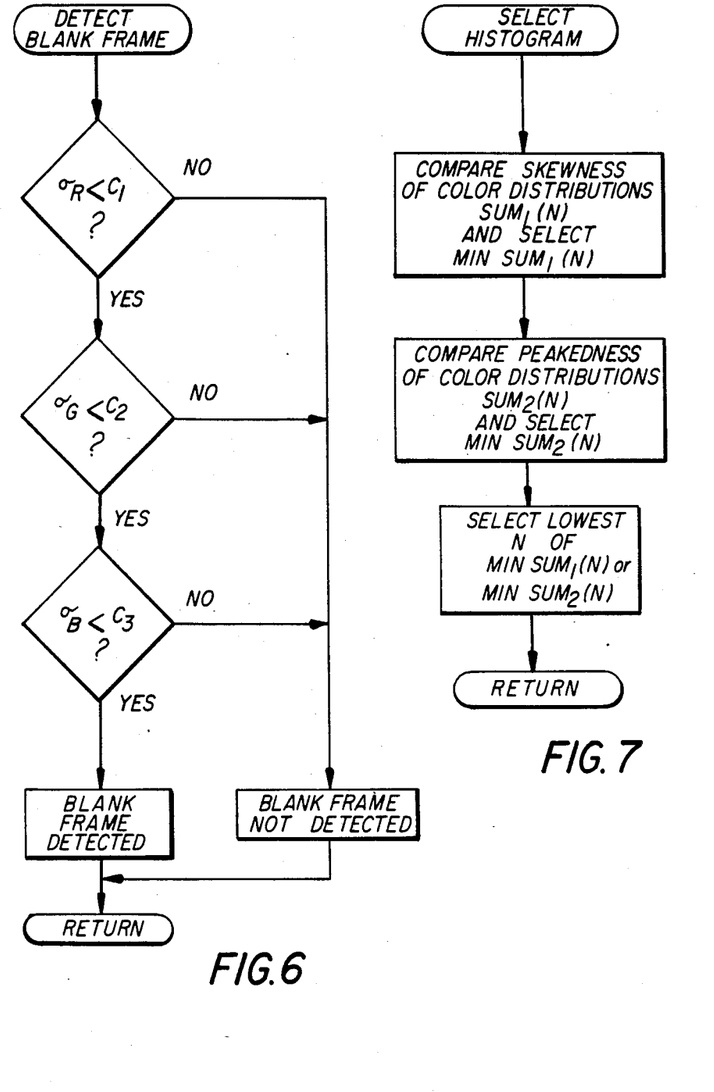

Referring now to FIG. 6, the steps involved in detecting a blank frame according to the invention will be described. The standard deviations of $\sigma_R$ $\sigma_G$ and $\sigma_B$ of the full red, green and blue color value distributions are checked against three predetermined constant values $C_1$, $C_2$ and $C_3$. If all three standard deviations are less than the respective predetermined constant values, the frame is determined to be a blank, and a signal representing a blank frame is generated and sent to the system control electronics 60. The system control electronics causes the digital image processor to skip the frame and advances the film to the next frame via film advance motor 21.

If a blank frame is not detected, one of the contrast intervals is selected, and the respective red, green and blue distributions therein are provided to the histogram normalizer.

Referring to FIG. 7, the steps involved in selecting the contrast interval will be described. The selection criteria involves comparing the skewness of the color value distributions in each of the contrast intervals as follows:

$$SUM_1(N) = |\beta_{1R} - \beta_{1G}| + |\beta_{1B} - \beta_{1G}| + |\beta_{1R} - \beta_{1B}| \qquad (7)$$

where $SUM_1$ (N) is a measure of the difference in skewness between the three color distributions in the Nth contrast interval. The contrast interval having the most similar distribution, i.e. the lowest value of $SUM_1$ (N) is identified.

Next, the peakedness of the three color value distributions in each contrast interval is compared as follows:

$$SUM_2(N) = |\beta_{2R} - \beta_{2G}| + |\beta_{2B} - \beta_{2G}| + |\beta_{2R} - \beta_{2B}| \qquad (8)$$

where $SUM_2(N)$ is a measure of difference in peakedness between the three color value distributions in the Nth contrast interval. The contrast interval having the most similar distributions, i.e. the lowest value of $SUM_2$ (N) is identified.

Finally, the lowest contrast interval (i.e. the interval representing the lowest contrast) between the two identified contrast intervals is selected.

Figure 8:
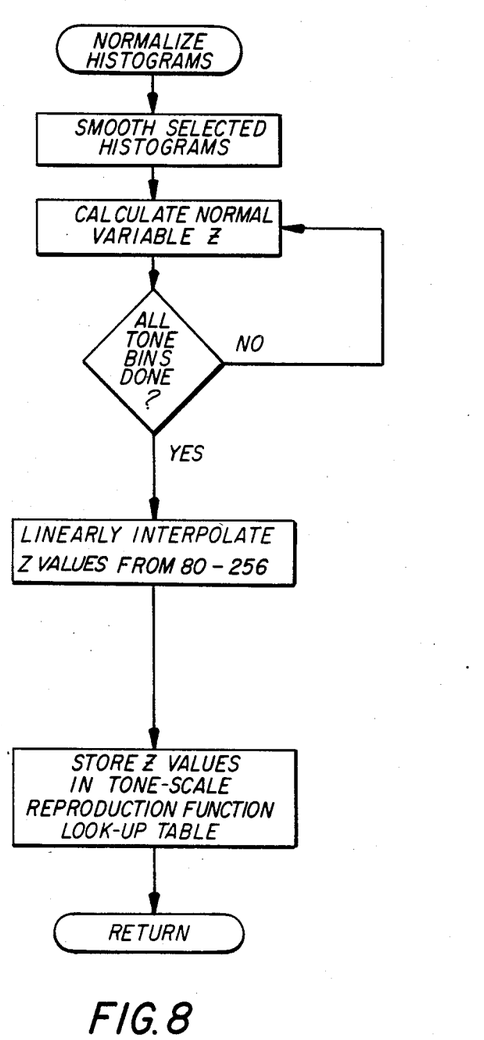

Turning now to FIG. 8, the steps involved in normalizing the color value histograms in the selected contrast interval to generate the color reproduction functions will be described. To normalize a histogram, the standard normal variate Z for all 80 color value bins in the contrast interval is computed. First however, an average smoothing operation is performed on the selected color value distribution to remove any spikes. The smoothing is performed on the counts in 3 consecutive color value bins as follows:

$$h_i = \tfrac{1}{3}(h'_{i-1} + h'_i + h'_{i+1}) \qquad (9)$$

where
$h'_i$ is the count in bin i and
$h_i$ is the smoothed value.

Next, the standard normal variate Z is calculated for the smoothed values of the histogram as follows (from *Approximations for Digital Computers*, Hastings C., Princeton Univ. Press.):

$$Z_j = t_j - \frac{a_0 + a_1 t_j}{1 + b_1 t_j + b_2 t_j^2} \qquad (10)$$

where $$t_j = \sqrt{\ln(1/P_j^2)}$$

$a_0 = 2.30753 \quad b_1 = .99229$

-continued $$a_1 = 0.27061 \quad b_2 = .04481$$

The probability $P_j$ for each of the 80 bins is given by $$P_j = \frac{\sum_{i=1}^{j} h_i}{\sum_{i=1}^{80} h_i} \quad (11)$$

where $h_i$ are the smoothed counts in the ith color value bin, and $j=1$ to 80.

Next, the Z values are linearly interpolated from 80 to 256 values to provide a Z value for each of the 256 possible scanner inputs represented by the 8-bit digital code. Finally the 256 Z values are stored in the color reproduction function lookup tables 22. This process is applied to each of the three color samples of tone values in the selected contrast interval.

Figure 9:
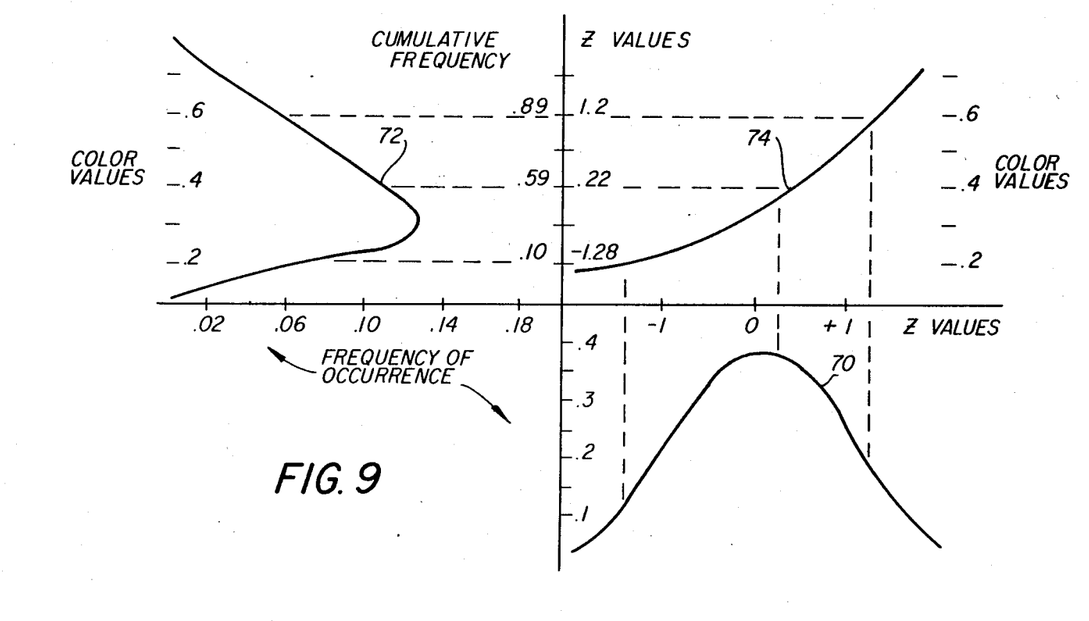
FIG. 9 is a graph showing the form of the color reproduction functions generated according to the method outlined in FIG. 8.

FIG. 9 is a graph showing the form of the color reproduction functions produced by normalizing the samples of color values. In the lower right quadrant of the graph, a curve labeled 70 represents a standard normal distribution showing the probability of the occurrence of a value plotted against the standard normal variate Z. In the upper left quadrant of the graph, the curve labeled 72 represents the sample of color values from the image, plotted against relative probability of occurrence. The central ordinate of the graph relates the relative probability $P_j$ of the color value distribution to Z values according to the relationship defined by equation 10. The color reproduction curve, labeled 74, maps the Z values on the ordinate to the same Z values on the abcissa. A color value scale on the far upper right of the diagram, congruent to the color value scale on the far left, shows how the color reproduction function relates color values to Z values.

After the three color reproduction function lookup tables are generated, all of the color values of the image are processed by applying the respective color reproduction functions to them. At this point, the processed color values from the image are dimensionless quantities representing Z values.

To recover the processed image, these dimensionless quantities are given magnitudes with respect to the original image and the output medium by multiplying the Z values with a multiplier $\sigma_z$ that adjusts the contrast of the processed image. To adjust the color balance of the image, a constant term is added to each of the three color values. The additive constant term relates the Z values in each color to the density of the output medium for the respective color, thereby causing equal Z values in all three colors to be reproduced as a shade of gray.

Appropriate values for the multiplier $\sigma_z$ that adjusts contrast and the additive constants that determine the color balance of the processed image are determined as follows. The multiplier is computed based on the statistics of the green color values alone, but is applied to all three colors. The intrinsic contrast of natural scenes can be quantified in terms of the standard deviation of log reflectance of edges in the scene or the density representation of these log reflectances in the photographic image. On the average the approximate relationship between the two is given by:

$$\sigma_D = \overline{G} \cdot \sigma_R \quad (12)$$

where:

$\overline{G}$ = average gradient of the photographic film (relates $\sigma_R$ to some specific reproduction medium contrast)

$\sigma_R$ = standard deviation of log reflectance based on a large number of original scenes $\sigma_D$ = standard deviation of density Typical values for $\sigma_R$ and $\overline{G}$ for color photographic film are 0.31 and 0.68 respectively, such that $\sigma_D$ is 0.21. Departures from this average contrast must be compensated. A general equation may be stated as:

$$\sigma_z = m \cdot f(\sigma_s) + b \quad (13)$$

where:

$\sigma_s$ = individual scene standard deviation, from the selected contrast interval m and b are system dependent constants and $f(\sigma_s)$ is some function of the sample standard deviation $\sigma_z$ = the multiplier applied to the values obtained from the color reproduction function.

A simple and satisfactory implementation is obtained from:

$$b = \sigma_D \cdot (1.0 - m) \quad (14)$$

$$\sigma_z = m \cdot \sigma_s + b \quad (15)$$

where:

m is typically between 0.6 and 0.8.

The sign of $\sigma_z$ is positive if the reproduction has the same polarity as the original image (negative-to-negative or positive-to-positive). If the reproduction has a polarity of an opposite sense with respect to the original, e.g., negative-to-positive, then the sign of $\sigma_z$ is negative.

For example, if a color negative image is to be printed directly onto color photographic paper, the log exposure for the desired mean paper density for each color is simply added to the translated, contrast-adjusted values of the respective colors. The complete calculation is given by:

$$\log E_{ZD} = -\sigma_z Z_D + \log E_A \quad (16)$$

where:

$\log E_A$ = log exposure required to obtain the aim paper density $Z_D$ = translated Z value for some input density in the original image $\log E_{ZD}$ = log exposure for $Z_D$.

Industrial Applicability and Advantages

The method of detecting blank frames according to the present invention is useful in the graphic arts and photographic printing fields to automatically detect and skip blank frames in automatic photographic printers. The method is advantageous in that a greater percentage of blank frames are deleted automatically, without the need for operator intervention, than by the methods of the prior art.

The invention is especially useful with scanning color photographic printers employing digital image processing of the type that includes statistical modification of the color value distributions, since the statistics necessary for detecting the blank frames are readily available.

I claim:

1. A method of automatically detecting the presence of a blank film frame in a scanning-type photographic color printer, characterized by:
   scanning a film frame in three colors to produce a sample of color values for each of the three colors;
   forming a histogram from each of the samples of color values;
   computing the standard deviation of each of the histograms; and
   detecting the presence of a blank film frame on the basis of the magnitudes of the standard deviations.

2. The method of automatically detecting the presence of a blank film frame claimed in claim 1, wherein said detecting step comprises testing whether the magnitudes of the standard deviations are less than respective predetermined constants.

3. A method for automatically detecting and signaling the presence of a blank film frame in a photographic color printer, comprising the steps of:
   scanning a film frame in three primary colors to generate a sample of color values for each of the three primary colors;
   compiling each of the samples of color values into a color histogram;
   computing the standard deviation of each of the color histograms;
   comparing the computed standard deviations with respective predetermined constants; and
   detecting and signaling the presence of a blank film frame when each of the standard deviations is less than the respective predetermined constant.

4. Apparatus for automatically detecting and signaling the presence of a blank film frame in a color photographic printer, comprising:
   means for scanning a film frame in three primary colors to generate a sample of color values for each of the three primary colors;
   means for compiling each of the samples of color values into a color histogram;
   means for computing the standard deviation of each of the color histograms; and
   means for comparing the standard deviations with respective predetermined constants and for generating a signal indicating the presence of a blank film frame when each standard deviation is less than the respective predetermined constant.

5. A method for automatically detecting and signaling the presence of a blank film frame in a photographic color printer, characterized by:
   scanning a film frame in three colors to produce a sample of color values for each of the three colors;
   forming a histogram from each of the samples of color values;
   computing the standard deviation of each of the histograms;
   comparing the standard deviations with respective predetermined constants; and
   generating a signal for signaling the presence of a blank film frame when each of the standard deviations is less than the respective predetermined constant.

* * * * *